May 31, 1960  J. D. WATTS ET AL  2,938,562
STRUCTURE FOR LINING TUBULAR MEMBERS
Filed Dec. 24, 1957  5 Sheets-Sheet 1
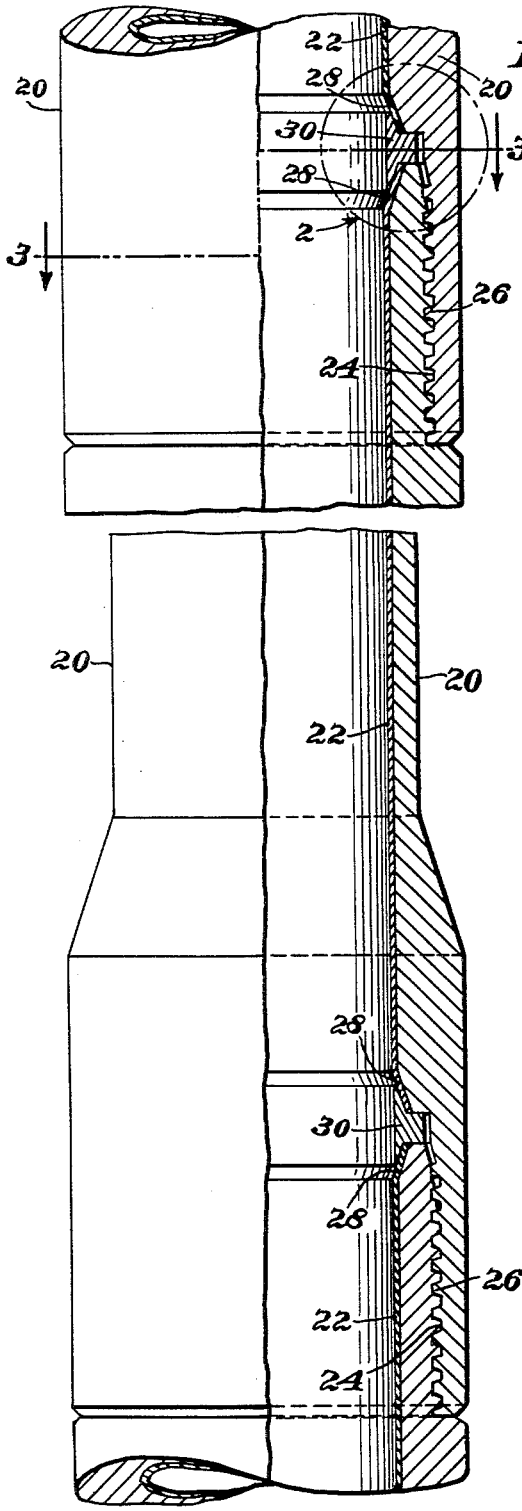
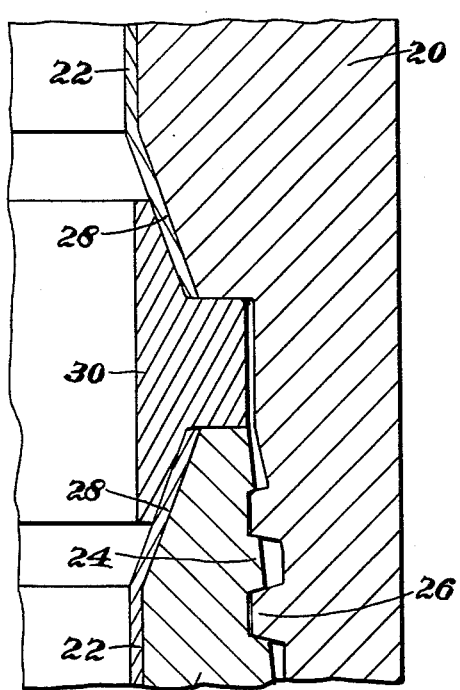
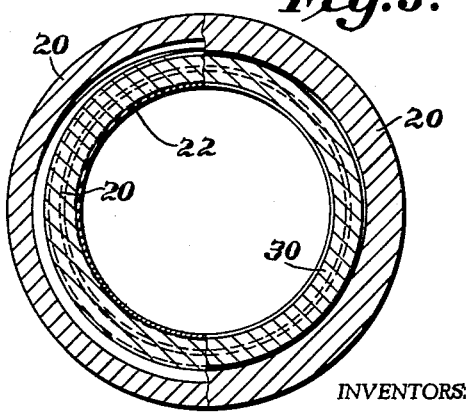
INVENTORS:
John D. Watts, &
Elwood K. Pierce,
BY Cushman, Darby & Cushman
ATTORNEYS.

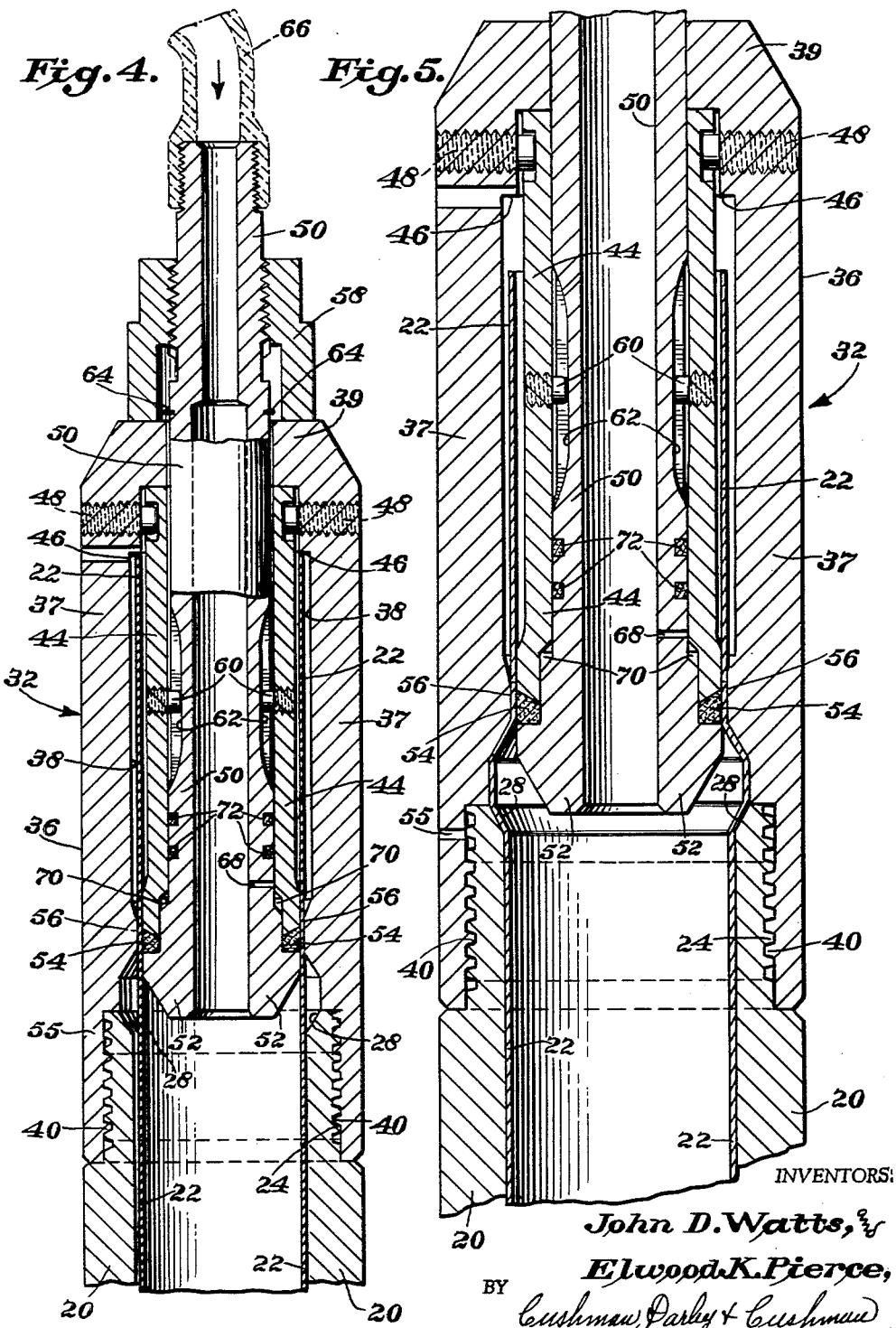

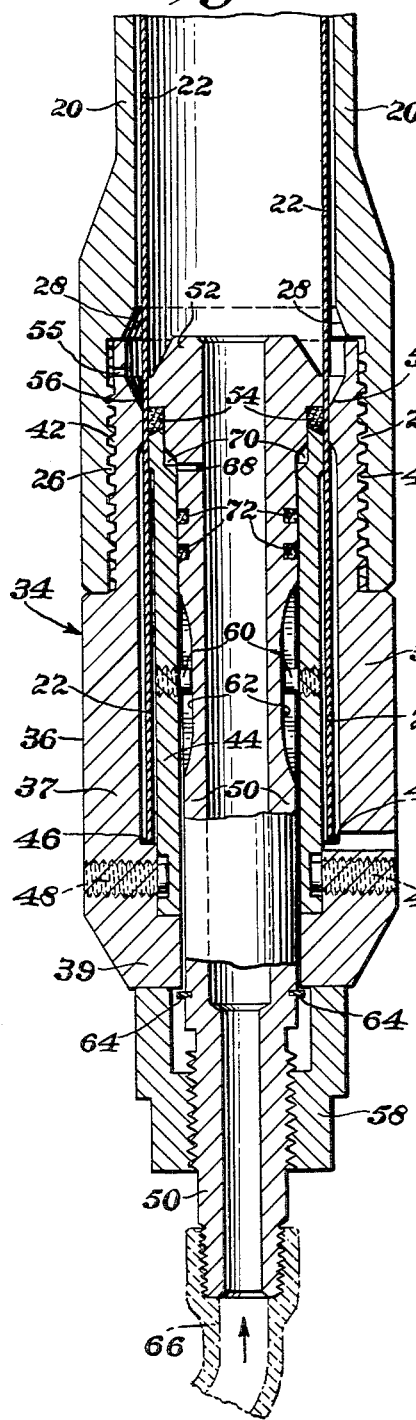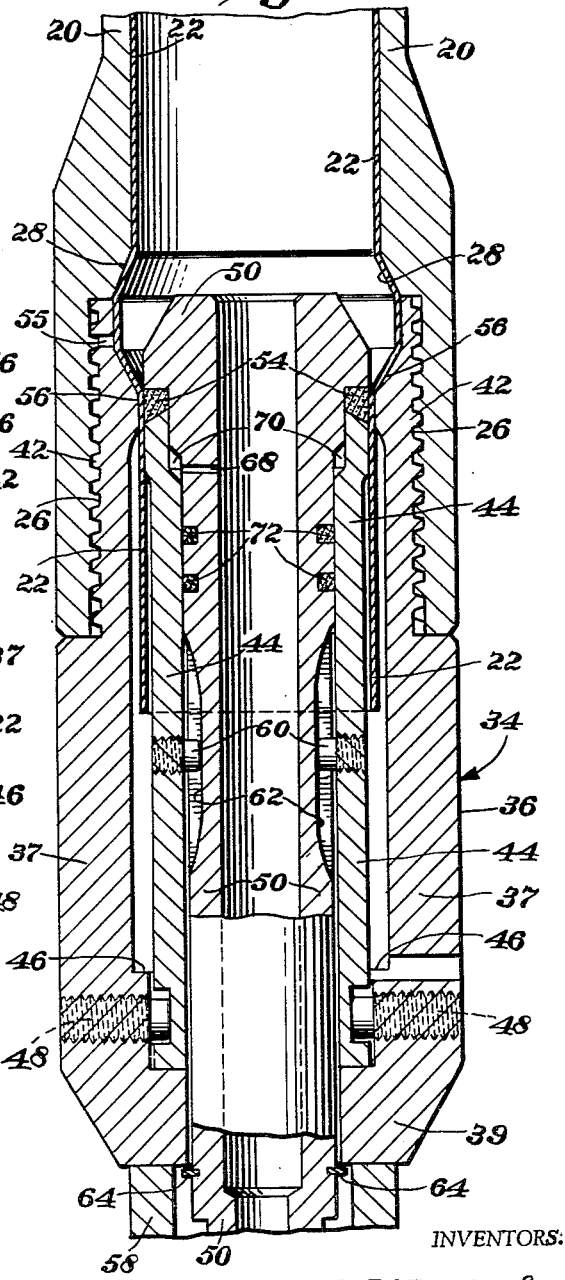

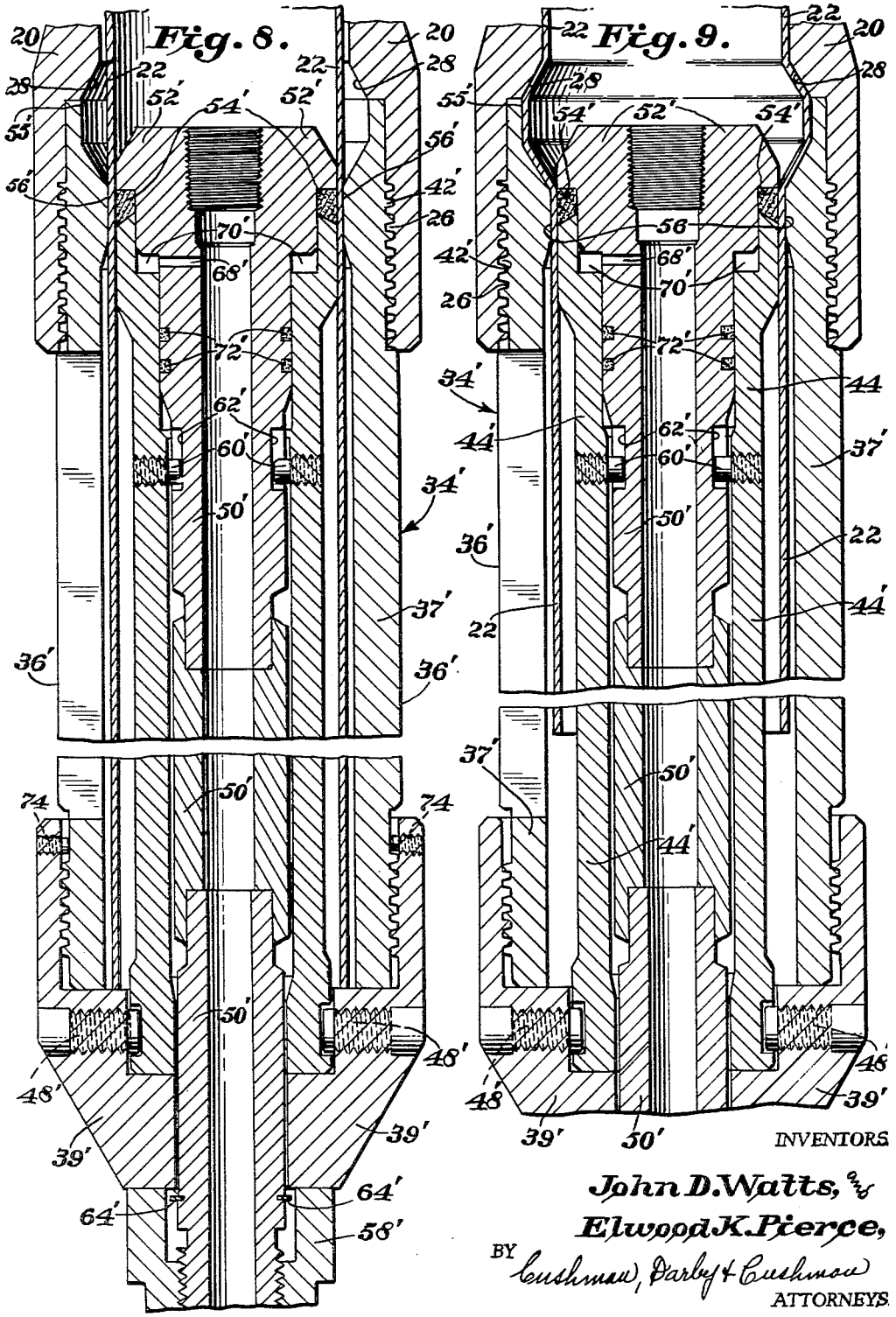

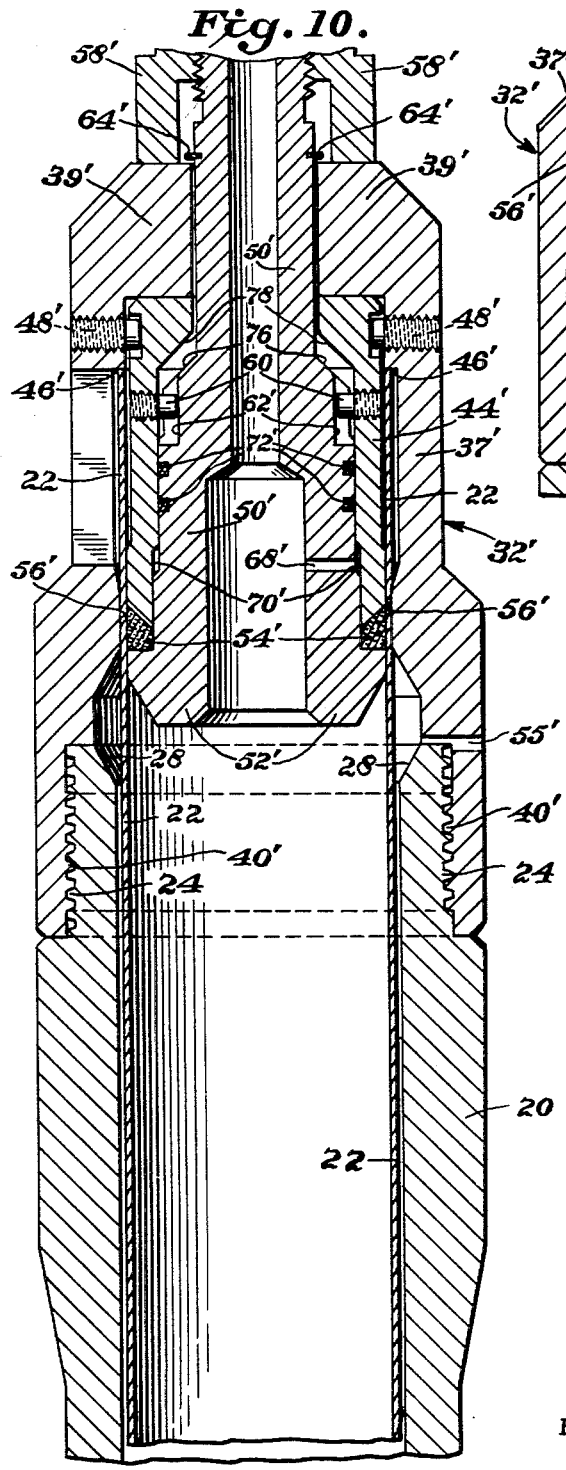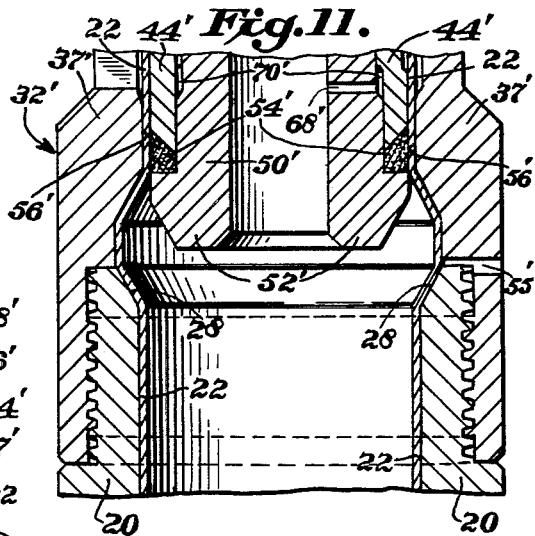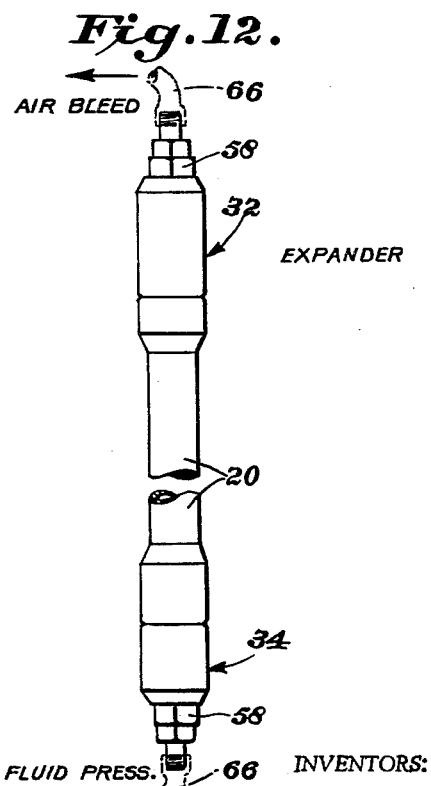

United States Patent Office
2,938,562
Patented May 31, 1960

2,938,562
STRUCTURE FOR LINING TUBULAR MEMBERS

John D. Watts and Elwood K. Pierce, Houston, Tex., assignors to Gray Tool Company, Houston, Tex., a corporation of Texas Filed Dec. 24, 1957, Ser. No. 704,979

1 Claim. (Cl. 153—1)

This invention relates to the lining of pipes or tubular members and in particular to a structure and method utilizing fluid pressure for radially expanding a tubular liner into engagement with the internal walls of a tubular member.

It has heretofore been proposed to effect a lining of tubular members or pipes by utilizing fluid pressure to radially expand a relatively ductile and thin wall liner into engagement with a more rigid tubular member. It has further been proposed to line the tubular member by first disposing the liner longitudinally within the tubular member, engaging expander tools to each end of the liner and then introducing fluid pressure into the liner to expand it. However, the structures and methods heretofore proposed have not been entirely satisfactory, particularly when the radial expansion that the liner must undergo for securing it to the outer tubular member results in significant reduction or contraction of the length or axial dimension of the liner. Understandably, the axial contracting movement of the liner relative to the outer tubular member must be permitted without undesirable loss of fluid pressure within the liner so that the radial expansion step may be effectively performed. In other words, the operating and necessary fluid pressure for expansion must be maintained within the liner until the expanding step terminates, notwithstanding the magnitude of the concomitant axial contracting movement of the tubular liner relative to the outer tubular member during expansion.

Accordingly, an important object of this invention is to provide a novel structure and method utilizing fluid pressure to expand a tubular liner into engagement with a tubular member and particularly adapted to effectuate the desired lining irrespective of the amount of axial contracting movement the liner undergoes during expansion.

A further object resides in the provision of novel expander tools for use in lining tubular members in the manner referred to and engageable to the liner at each end thereof whereby the necessary fluid pressure seals are maintained during expansion, and also whereby the axial contracting movement of the liner during expansion can be controlled. A related and more specific object is to provide novel structure in the expander tools operable in response to the introduction of fluid pressure into the liner to effectively regulate the axial contracting movement of the expanding liner so that the liner remains substantially stationary relative to one of the tools and moves relative to the other tool during liner expansion.

A still further object resides in the development of a novel method of lining pipes, in the manner referred to, utilizing the fluid pressure introduced into the liner to establish and maintain fluid pressure seals at each end of the liner whereby the nature of the axial contracting movement of the expanding liner can be desirably controlled without impairing the fluid tightness of the seals.

Yet another object is to provide expander tools constructed to simplify and facilitate the procedure of lining tubular members in the manner referred to.

Further objects and advantages of the invention will be in part obvious and in part pointed out hereinafter.

The novel features of the invention may be best made clear from the following description and accompanying drawings in which:

Figure 1 is a fragmentary elevational view partly in vertical section, of an exemplary construction of tubular members internally lined in accordance with the invention;

Figure 2 is an enlarged fragmentary, sectional view taken generally in the region identified by numeral 2 in Figure 1;

Figure 3 is a horizontal sectional view taken generally along the line 3—3 of Figure 1;

Figure 4 is a vertical sectional view of an embodiment of an expander tool of the invention shown associated with one end of an exemplary tubular member and liner therefor, before expansion of the liner;

Figure 5 is an enlarged fragmentary view corresponding to Figure 4 and showing the liner in its expanded condition;

Figure 6 is a vertical sectional view similar to Figure 4 and showing an embodiment of an expander tool of the invention associated with the opposite end of the tubular member and liner, also before the liner is expanded;

Figure 7 is an enlarged view corresponding to Figure 6 and showing the liner in its expanded condition;

Figure 8 is a fragmentary and enlarged vertical sectional view corresponding to Figure 6 and showing a modification of the expander tool of that figure;

Figure 9 is a view corresponding to Figure 8 and showing the liner in its expanded condition;

Figure 10 is a fragmentary and enlarged vertical sectional view corresponding to Figure 4 and showing a modification of the expander tool of that figure;

Figure 11 is a view corresponding to a portion of the structure illustrated in Figure 10 and showing the liner in its expanded condition;

Figure 12 is a reduced and partially cut away view of a tubular member having expander tools of the invention engaged in operative relation to opposite ends thereof.

Internally lined pipes, conduits or other tubular members have numerous applications in many industries and environments. They are particularly useful when the exterior and interior of the tubular members are not exposed to the same conditions, such as would occur in the handling of fluids where a good corrosion resistant surface is needed on the inside of the pipe, whereas the exterior thereof is not exposed to or in contact with a particularly harmful or corrosive environment and hence, need not possess the same corrosion resistant properties as the interior of the pipe. One field of application is in oil well operations where it may be desirable and/or necessary for certain pipe sections to be adequately protected internally against the possibly harmful action of fluids flowing therethrough. It will be evident from the following description, however, that the novel means and method of the invention are suitable for lining pipes or conduits irrespective of the particular industry or environment in which the pipe will be used.

Furthermore, the invention is not intended to be limited to any particular type of pipe or conduit, although it will be shown and described for illustrative purposes as being used to provide inner linings on individual pipe sections adapted to be connected or coupled together with sealing means to form an extended conduit length, wherein the pipe sections and sealing means may be of the general type disclosed in patents, 2,766,829, 2,766,998, 2,766,999. Internally lined and coupled pipe sections of this general type are illustrated in Figure 1 and indicated by numeral 20, the liner itself being indicated by numeral 22. The pipe sections may be joined together at their ends by any suitable structure. For example, as shown, one end of the section may be externally threaded as at 24 while the other end is internally threaded as at 26. The illustrative forms of the invention, later to be described, are especially adapted to be used with pipe sections threaded in this manner; however, it will be evident that the invention comprehends lining pipes having different and not necessarily equivalent end constructions.

Each end of the pipe sections 20, as best seen in Figure 2, is formed with an outwardly flaring or tapering internal annular portion or seat 28 adapted to be disposed adjacent a corresponding portion on an adjacent pipe section joined thereto whereby such adjacent portions 28 form an annular recess for reception of the sealing ring 30. The pipe sections 20 and liner 22 may be constructed of any suitable material. The liner 22 preferably is made of some suitable corrosion resistant and relatively ductile material, and the pipe section 20 is constructed to have greater rigidity than the liner, while the sealing ring 30, if intended to withstand high pressures, preferably is made of a hard metal or the like. In the illustrative construction, the ring 30 preferably is also corrosion resistant and may be made of the same material as the liner 22. The liner 22 preferably covers the flaring seats 28, as shown, whereby the entire internal surface of the conduit length formed by the coupled pipe sections 20 will be protected and each joint between adjacent sections will be desirably sealed against leakage. Pipe sections so lined and joined together can be advantageously employed in oil well operations as well as other operations where fluids under high pressures are handled.

As noted hereinabove, a suggested lining operation involves initially disposing the tubular liner longitudinally within the pipe or tubular member, with the liner projecting outwardly from each end of the pipe. This suggested operation further contemplates arranging tools at each end of the liner and in sealing engagement therewith, after which fluid pressure is introduced into the liner to expand it against the tubular member. In one aspect, the present invention contemplates improving this operation by controlling the axial contracting movement of the expanding liner so that it will take place in a desired and predetermined manner, thus eliminating one unknown or variable normally involved in the lining operation. In another aspect, the invention contemplates the design of improved expander tools having fluid seals and associated structure for engagement to each end of the liner and tubular member whereby the seals will be held stationary and in fluidtight relation to the liner while the latter expands radially and contracts axially. A further and more specific aspect contemplates expander tools including fluid-pressure actuated structure for the fluid sealing means whereby the contact pressure or force exerted by the sealing means against one end of the liner will be less than the corresponding pressure exerted by the sealing means against the other end of the liner during its radial expansion. Stated differently, there will be greater frictional hold by the sealing means at one end of the liner than the sealing means at the other end whereby one end of the liner will remain substantially stationary axially with respect to the adjacent end of the tubular member while the other end of the liner moves axially relative to the adjacent end of the tubular member during the radial expansion of the liner.

One embodiment of expander tools of the invention is shown in Figures 4–7 in operative position with respect to a tubular member and liner such as illustrated in Figure 1. Referring to Figure 4, numeral 32 indicates the expander tool for one end of the liner and referring to Figure 6, numeral 34 indicates the expander tool for the other end of the liner. Both of these tools 32, 34 preferably are of similar construction, and hence, corresponding parts thereof will be identified by the same reference numerals. Each tool includes a somewhat cup-shaped body portion 36 having side walls 37 and base wall 39 defining a recess 38 therein. Recess 38, as shown, is open at one end and closed by base wall 39 at the other end. The body portion 36 is intended to be engaged by suitable means to the pipe or tubular member to be lined. When lining pipe sections such as those shown in Figure 1, the body portion 36 of expander 32 may be provided with internal threads 40, as shown, and the expander 34 may be externally threaded at 42, also as shown, for suitable engagement to the opposite ends of the pipe sections 20.

Disposed within the recess 38 in each tool and resting on the base wall 39 is a tubular sleeve 44 defining with side walls 37 an annular space for the reception of an end of the liner 22. An annular shoulder 46 preferably is formed, as shown, at the base of this space to limit inward movement of the liner, and suitable means such as the threaded studs 48 extend through the body portion and into blind holes at the inner end of sleeve 44, as shown, for preventing relative movement between the sleeve and body portion. For reasons to be apparent as the description proceeds, sleeve 44 terminates in a free end disposed somewhat inwardly of open end of the recess 38, in the manner illustrated.

A hollow piston-like member 50 preferably extends through the base wall 39 of the body portion 36 and through the sleeve 44 terminating in a piston head 52. A sealing ring 54 of suitable compressible material is arranged between the outer end of the sleeve 44 and the back of the piston head 52, as shown, and an annular backing surface 56 projects inwardly from the side wall 37 of the body portion 36 adjacent to and at substantially the same level as or generally coplanar to the sealing ring 54. Surface 56 preferably flares outwardly toward the open end of the body portion 36 as shown, and the inner diameter of the surface 56 is approximately equal to the outer diameter of the liner 22, for a purpose to be apparent hereinafter.

Piston 50 is slidable in the sleeve 44 and preferably is threadedly engaged to a suitable nut 58 engaged thereto externally of the base wall 39 of the body portion. Suitable means preferably are utilized for confining the piston 50 to rectilinear movement. Such means may be in the form of studs 60 extending through the sleeve 44 into external longitudinal grooves 62 formed in the piston, as shown. As will be evident, rotation of nut 58 will thereby cause axial or longitudinal movement of the piston 50 relative to sleeve 44 and body portion 36. A locking ring 64 or other suitable means may be arranged on the piston externally of base wall 39 and adjacent the nut 58 for limiting the inward movement of the piston relative to the body portion 36.

The hollow piston 50 constitutes a fluid passageway or conduit opening into the liner 22 when the tool is in operative position. And a suitable conduit 66, shown in phantom lines, is connected to the end of the piston 50 and may be in communication with any desirable source of fluid pressure (not shown) whereby fluid under pressure can be introduced into the liner.

As indicated in Figures 4, 6, and 12, the tools 32, 34 will be initially connected to the ends of the tubular member 20 with the end portions of liner 22 fitted between the seal 54 and the associated backing surface 56 and disposed in the space surrounding the sleeve 44, with the ends of the liner resting on the shoulders 46. The adjustable nuts 58 may be turned at this time to move the piston 50 so that piston head 52 moves toward the sleeve 44 to thereby slightly compress the sealing rings 54 so that they expand radially against the sleeves 44. When fluid pressure is then introduced into the liner, it will act on the inner or free end of the piston head 52, causing a further movement of the piston head toward the adjacent open end of sleeve 44. Such piston movement axially compresses the sealing rings 54 and forces them radially against the sleeves 44 so that the sealing rings will now be in desired fluidtight contact with the liner 22. Backing surface 56 will prevent undesirable deformation of the liner when the rings 54 are thusly pressed against the liner, and will also cooperate with the rings 54 to enable the liner to move longitudinally relative to rings 54, such as during radial expansion of the liner, without impairing the effectiveness of the seals 54.

As an important feature of the invention, the tools 32, 34 preferably are provided with means responsive to fluid pressure in liner 22 for assuring a greater frictional hold on the liner 22 by one of the sealing rings 54 than the other. Preferably, such means includes a lateral or radial passage 68 extending through the piston 50 adjacent the piston head 52 and opening into an annular chamber 70 formed by opposed and complementary surfaces on the piston 50 and sleeve 44, as shown. It will be noted that the portions of sleeve 44 and piston 50 surrounding this chamber are slightly offset radially, and the enlarged portion of the piston inwardly of the piston head 52 can thus reciprocate in the offset open end of the sleeve to vary the volume of chamber 70. Suitable sealing means, such as O-rings 72, are provided between the piston and sleeve to prevent leakage therebetween. Thus, some fluid under pressure will enter chamber 70 when fluid is introduced into the liner, and exert a force on the piston acting in an opposite direction from the force produced by the fluid pressure acting on the outer or free end of the piston head 52. Thus, the difference between these two forces will determine the amount of compression the ring 54 undergoes and consequently, the amount of radial or contact pressure exerted by the ring 54 against the liner 22.

As is evident, the working area of the piston head 52 over which the fluid pressure is exerted is greater than the working area in the chamber 70 so that the fluid pressure force moving the piston head 52 against ring 54 will be greater than the fluid pressure force in the chamber 70 acting to move the piston head away from the ring 54. Additionally, a force of the seals 54 against the back of the piston head 52 will be developed as a result of their compression but this will be overcome by the resultant fluid pressure force acting against the free end of the piston head.

With this arrangement, it is possible to effectively assure a desirable difference in the friction hold of each ring 54 on the liner. For example, the annular expansible and contractible chamber 70 in expander tool 32 can be constructed so that it includes a smaller radial dimension in cross section or is narrower than the corresponding dimension of the chamber 70 in expander 34 whereby the ring 54 in expander 32 will grip the liner more tightly than the ring 54 in the expander 34. In other words, the fluid pressure in the larger chamber 70 in expander 34 will produce a greater force counteracting the force of the fluid pressure acting to move the free end of the associated piston head 52 against ring 54, than that produced by fluid pressure in the smaller chamber 70 in the other expander 32. Accordingly, sealing ring 54 in expander 34 will not be compressed to as great a degree as the ring 54 in expander 32. Such difference in the liner gripping or holding action of the rings 54 results in slippage or longitudinal movement of the liner 22 relative to expander 34 during radial expansion of the liner, while the ring 54 in expander 32 will hold the liner 22 axially stationary at this end relative to tool 32 during liner expansion. As previously indicated, the contact pressure of ring 54 of expander 34 against the liner, although permitting axial contracting movement of the liner during its radial expansion, is sufficient to prevent leakage or loss of fluid pressure from within the liner.

In lining tubular members having interior walls which flare outwardly at the ends thereof, such as pipes 20, it will be apparent that after the liner 22 has been expanded into desired engagement with the cylindrical portion of the interior walls, further expansion of the liner will take place at each end to form an annular bulge in the liner conforming to the shape of the flared end 28 of the interior wall of the pipe 20 and also to the shape of the outer end of the inner surface of body portion side walls 37, as indicated in Figures 5 and 7. Such further expansion results in some limited axial movement of the liner 22 relative to both expanders 32, 34. The sealing rings 54 are held sufficiently tightly engaged to liner 22 to prevent leakage during this further contracting movement of the liner. Thus, substantially all of the axial contracting movement of the liner 22 that occurs during its radial expansion will take place at one end thereof, that is, at the end where the sealing ring 54 exerts the smaller frictional holding force on the liner 22. By virtue of this arrangement, wherein the axial contracting movement of the liner is controlled and takes place in a predetermined manner, various dimensions of structure and parts involved in the lining operation can be desirably predetermined.

Suitable vents such as holes 55 preferably are formed in tool 34 adjacent the threaded end thereof, as shown, to allow fluids to escape from the space between the liner 22 and pipe 20 during liner expansion. This will enable the liner to move firmly against the inside of the pipe.

Figures 8–11 illustrate modifications of the expander tools previously described. These modified forms involve structures similar to those described for expanders 32, 34 and, accordingly, all corresponding parts will be identified by similar reference numerals. In Figure 8, the expander tool 34' includes the body portion 36' constructed of a tubular portion 37' and a base portion 39' suitably joined together as by the threaded connection shown. If desired, suitable locking means, such as studs 74, may be provided to prevent relative rotation between portions 37', 39'. External threads 42' may be formed at the free end of the tubular portion 37' for engaging the expander tool to the pipe section 30 in the manner indicated. Expander 34' also includes the sleeve 44', the piston 50', the sealing ring 54' disposed therebetween, and the backing surface 56', all as previously described. The piston 50', as shown, may be formed of separate and joined sections and the annular chamber 70' is again formed between the piston 50' and sleeve 44' communicating with the hollow interior of the piston through lateral passage 68'. Studs 48' and 60' may again be utilized for respectively preventing movement of the sleeve 44' relative to the body portion 36' and for limiting the piston 50' to rectilinear movement.

One of the differences between the expander 34' of Figure 8 and expander 34 of Figure 6 is that the former is able to accommodate a greater length of the liner 22 projecting from the pipe section 20, whereby a greater reduction in the length of the liner due to radial expansion can be accommodated, as might be the case where a relatively long length of pipe 20 is to be lined.

The expander 32' of Figure 10 corresponds to the expander 32 of Figure 4 but, as is evident, is of smaller length. The grooves 62' in piston 50' of expander 32' for receiving the studs 60' will be seen to be disposed adjacent the inner end of sleeve 44', and complementary tapering surfaces, converging toward base wall 39', may be provided on the piston 50' and sleeve 44', as indicated respectively by numerals 76, 78.

The expanding operation involved when expander tools 32' and 34' are employed is essentially the same as was the case for expanders 32, 34. It will be noted, however, that the radial dimension or working area of the annular chamber 70' in expander 34' is shown to be appreciably greater than that of chamber 70' in expander 32'. This relation, as referred to above, brings about the desired difference in the frictional holding forces of each of the sealing rings 54' on the liner 22. Figures 9 and 11 illustrate the condition of the liner 22 after being fully expanded into contact with the pipe section 20.

Although the method of operation of the invention has been largely covered in the foregoing description of the structure of the expander tools, it will now be set forth in detail for the purpose of facilitating the understanding thereof. The method, as in the case of the structure, will be set forth as applied to the lining of pipe sections such as those illustrated in the drawings; however, it is understood that it will likewise be applicable to the lining of pipes or other tubular members of configurations different from that of the pipe sections 20. Liner 22 is first inserted longitudinally into the tubular member and the expanders are then slipped over the ends of the liner and connected to the adjacent ends of the pipe section with the liner extending into the annular space between the sleeve 44 and body portion 36 and resting against shoulder 46. The liner 22 initially is of somewhat smaller outer diameter than the inner diameter of the pipe 20, as indicated in Figures 4, 6, 8, 10. The attachment of each body portion 36 to the adjacent end of the pipe section substantially balances the end load applied to the piston heads 52 when fluid pressure is introduced into the liner. The adjusting nuts 58 may be initially arranged so that the space between the ring 54 and adjacent surface 56 results in some engagement of the rings 54 to the liner 22. It should be understood that the invention, as indicated heretofore, does not contemplate relying on adjusting nuts 58 for effecting the desired compression of the rings 54 into operative fluid tight engagement with the liner.

Fluid pressure is then suitably introduced into the liner and the desired compression of sealing rings 54 into sealing engagement with the liner 22 is effected in the manner heretofore explained. In establishing the necessary operating fluid pressure within the liner for expansion, the liner may be filled with some relatively incompressible liquid, such as water, introduced through one of the pistons 50, while air may be bled out through the other piston. The liquid in the liner may then be placed under a suitable pressure by the introduction of same through one or both of the pistons 50 at each end. Preferably, the pressure within the liner 22 is sufficiently high to cause expansion of the liner beyond its elastic limit and expansion of the tubular member 20 within its elastic limit. The pressure is not sufficient to cause expansion of the tubular member 20 beyond its elastic limit. In this way, upon release of the pressure from within the liner, the tubular member 20 will radially contract tightly around the liner insuring the necessary tight fit.

As indicated hereinabove, in the illustrative embodiment of the invention, the axial contraction of the liner 22 caused by its radial expansion will substantially all take place at the end of pipe section 20 to which expander 34 is attached, the control of this contracting movement being effected by the operation of the fluid-pressure actuated structure for compressing the sealing rings 54.

After the expanding operation has been completed, the fluid pressure in the liner 22 is suitably released and adjusting nuts 58 may then be loosened and the expanders 32, 34 are conveniently detached.

In the case of lining tubular members having the configuration of pipe sections 20 and intended to be coupled to adjacent pipe sections with a sealing ring 30 therebetween, as illustrated in Figure 1, it will be noted that the excess liner projecting beyond the flaring seats 28 on the interior walls of the pipe sections will have to be removed. This can be done in any suitable manner. For example, a metal cutting tool such as a saw may be employed to cut off the excess liner at each end of the pipe, and the seats may then be finish machined by a suitable machining operation.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claim.

We claim:

A tool for use in the expansion of a tubular liner into engagement with the interior walls of a tubular member, said tool comprising: a hollow body portion formed with bottom and side walls defining a generally cylindrical recess therein opened at one end for receiving one end of the liner; said recess having an inwardly projecting stop surface adjacent the other end thereof for arresting axial inward movement of the liner in the recess; an annular backing surface projecting from said body portion side walls into said recess between said stop surface and said one end of said recess for external circumferential engagement to the liner; means for securing said tool to an end of the tubular member; a fluid conduit extending through said bottom wall into said recess and defining an annular chamber with said recess side walls for receiving the liner; said conduit being mounted for axial movement relative to said body portion; a sleeve surrounding said conduit; opposed and generally radially extending surfaces on said conduit and said sleeve defining an annular recess of variable width; a sealing ring of resilient material surrounding said conduit and disposed in said annular recess in generally coplanar relation with said backing surface; means for effecting axial movement of said conduit relative to said sleeve whereby to vary the width of said recess; means defining an expansible annular chamber between said sleeve and said conduit, said chamber being located intermediate said sealing ring and said stop surface and communicating with the interior of said conduit and operable in response to fluid pressure in said conduit to urge said opposed surfaces on said conduit and said sleeve away from each other.

References Cited in the file of this patent

UNITED STATES PATENTS

| | | |
|---|---|---|
| 942,184 | Persons | Dec. 7, 1909 |
| 952,545 | Persons | Mar. 22, 1910 |
| 1,741,217 | Winslow | Dec. 31, 1929 |
| 2,038,304 | Niddler | Apr. 21, 1936 |
| 2,228,139 | Leonhardy | Jan. 7, 1941 |
| 2,610,651 | Hahn | Sept. 12, 1952 |
| 2,631,640 | Zallea | Mar. 17, 1953 |
| 2,810,592 | Williams | Oct. 22, 1957 |
| 2,850,796 | Kaplowitz et al. | Sept. 9, 1958 |